(12) United States Patent
Chen et al.

(10) Patent No.: US 9,723,602 B2
(45) Date of Patent: Aug. 1, 2017

(54) INTERACTION BETWEEN EPCFICH AND EPDCCH IN LTE

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 13/943,756

(22) Filed: Jul. 16, 2013

(65) Prior Publication Data

US 2014/0036802 A1 Feb. 6, 2014

Related U.S. Application Data

(60) Provisional application No. 61/679,655, filed on Aug. 3, 2012, provisional application No. 61/707,854, filed on Sep. 28, 2012.

(51) Int. Cl.
*H04W 72/04* (2009.01)
*H04L 5/00* (2006.01)

(52) U.S. Cl.
CPC ......... *H04W 72/042* (2013.01); *H04L 5/0023* (2013.01); *H04L 5/0053* (2013.01);
(Continued)

(58) Field of Classification Search
CPC ... H04L 5/0023; H04L 5/0035; H04L 5/0048; H04L 5/0053; H04L 5/0094; H04L 5/005;
(Continued)

(56) References Cited

U.S. PATENT DOCUMENTS

2013/0039299 A1 2/2013 Papasakellariou et al.
2013/0083666 A1 4/2013 Gaal
(Continued)

FOREIGN PATENT DOCUMENTS

WO 2013009088 A2 1/2013

OTHER PUBLICATIONS

3GPP, Samsung, Multiplexing Distributed and Localized ePDCCHs, Dated May 21-25, 2012, #pp. 5.*
(Continued)

*Primary Examiner* — Jae Y Lee
*Assistant Examiner* — Jean F Voltaire
(74) *Attorney, Agent, or Firm* — Arent Fox LLP; Nerrie M. Zohn

(57) ABSTRACT

A method, an apparatus, and a computer program product for wireless communication are provided. In one configuration, the apparatus may be a UE. The apparatus may receive a message (e.g., via an ePCFICH) from an eNB and may process an ePDCCH using the message. The apparatus may receive a message via an ePCFICH indicating resources for ePDCCH, the ePDCCH being a localized ePDCCH and/or a distributed ePDCCH and process the ePDCCH using the message. The apparatus may receive an ePCFICH from an eNB, where the ePCFICH is a function of at least a PCI or a virtual cell identifier. The apparatus may process an ePDCCH using a default set of resources when an ePCFICH is not detected. The apparatus may receive an ePCFICH value and may determine either a starting symbol index for an ePDCCH or one or more ePDCCH resource sets based at least on the ePCFICH value.

41 Claims, 17 Drawing Sheets

(52) U.S. Cl.
CPC ....... *H04L 5/0094* (2013.01); *H04W 72/0453* (2013.01); *H04L 5/0035* (2013.01); *H04L 5/0048* (2013.01)

(58) Field of Classification Search
CPC ... H04W 72/042; H04W 24/08; H04W 88/02; H04W 24/10
USPC .................................................. 370/328, 329
See application file for complete search history.

(56) References Cited

U.S. PATENT DOCUMENTS

| | | | |
|---|---|---|---|
| 2013/0114495 A1 | 5/2013 | Chen et al. | |
| 2013/0114530 A1 | 5/2013 | Chen et al. | |
| 2013/0195067 A1 | 8/2013 | Khoshnevis et al. | |
| 2013/0201926 A1 | 8/2013 | Nam et al. | |
| 2013/0215842 A1 | 8/2013 | Han et al. | |
| 2013/0294317 A1 | 11/2013 | Malladi et al. | |
| 2013/0294333 A1 | 11/2013 | Chen et al. | |
| 2013/0294362 A1 | 11/2013 | Xu et al. | |
| 2015/0163687 A1* | 6/2015 | Lee ...................... | H04W 24/10 370/252 |

OTHER PUBLICATIONS

3GPP, Samsung, Multiplexing Distributed and Localized ePDCCHs, Dated May 21-25, 2012, 5 pages.*
Samsung, Multiplexing Distributed and Localized ePDCCHs, May 21-25, 2012.*
Research in Motion (Support Common Control Channel in E-PDCCH, Dated Mar. 26-30, 2012).*
Fujitsu: "Motivation, Requirements and Design for ePCFICH", 3GPP Draft; R1-122074 Motivation, Requirements and Design for EPCFICH, 3rd Generation Partnership Project (3GPP), Mobile Competence Centre; 650, Route Des Lucioles; F-06921 Sophia-Antipolis Cedex; France, vol. RAN WG1, no. Prague, Czech Republic; May 21, 2012-May 25, 2012, May 12, 2012 (May 12, 2012), XP050600363, [retrieved on May 12, 2012].
Fujitsu: "Requirements and Signalling for Configuration of UESSS and CSS on ePDCCH", 3GPP Draft; R1-121199 Requirements and Signalling for UESSS and CSS in E-PDCCH, 3rd Generation Partnership Project (3GPP), Mobile Competence Centre ; 650, Route Des Lucioles ; F-06921 Sophia-Antipolis Cedex; France, vol. RAN WG1, no. Jeju, Korea; Mar. 26, 2012-Mar. 30, 2012, Mar. 20, 2012 (Mar. 20, 2012), XP050599496, [retrieved on Mar. 20, 2012].
International Search Report and Written Opinion—PCT/US2013/050934—ISA/EPO—Mar. 12, 2014.
Fujitsu: "Motivation, Requirements and Design of ePCFICH", 3GPP Draft; R1-121202 Motivation, Requirements and Design of EPCFICH, 3rd Generation Partnership Project (3GPP), Mobile Competence Centre ; 650, Route Des Lucioles ; F-06921 Sophia-Antipolis Cedex; France, vol. RAN WG1, no. Jeju, Korea; Mar. 26, 2012-Mar. 30, 2012, Mar. 28, 2012 (Mar. 20, 2012), XP050599498.
Partial International Search Report—PCT/US2013/050934—ISA/EPO—Dec. 4, 2013.
Research in Motion et al: "Support Common Control Channel in E-PDCCH", 3GPP Draft; R1-121479 (RIM—Support Common Control Channel in E-PDCCH), 3rd Generation Partnership Project (3GPP), Mobile Competence Centre; 650, Route Des Lucioles ; F-06921 Sophia-Antipolis Cedex; France, vol. RAN WG1, no. Jeju, Korea; Mar. 26, 2012-Mar. 30, 2012, Mar. 20, 2012 (Mar. 20, 2012), XP050599760.
Samsung: "Enhanced PCFI CH", 3GPP Draft; R1-122261 EPCFICH, 3rd Generation Partnership Project (3GPP), Mobile Competence Centre; 658, Route Des Lucioles ; F-86921 Sophia Antipolis Cedex; France, vol. RAN WG1, no. Prague, Czech Republic; May 21, 2012-May 25, 2012, May 12, 2012 (May 12, 2012), XP858688524.
Samsung: "Multiplexing Distributed and Localized ePDCCHs", 3GPP Draft; R1-122256 D_L_EPDCCH Multiplexing, 3rd Generation Partnership Project (3GPP), Mobile Competence Centre; 650, Route Des Lucioles ; F-06921 Sophia-Antipolis Cedex ; France, vol. RAN WG1, no. Prague, Czech Republic; May 21, 2012-May 25, 2012, May 12, 2012 (May 12, 2012), XP050600519, [retrieved on May 12, 2012].

* cited by examiner

INTERACTION BETWEEN EPCFICH AND EPDCCH IN LTE

CROSS-REFERENCE TO RELATED APPLICATIONS

This application claims the benefit of U.S. Provisional Application Ser. No. 61/679,655, entitled "INTERACTION BETWEEN EPCFICH AND EPDCCH IN LTE" and filed on Aug. 3, 2012, and claims the benefit of U.S. Provisional Application Ser. No. 61/707,854, entitled "INTERACTION BETWEEN EPCFICH AND EPDCCH IN LTE" and filed on Sep. 28, 2012, which are expressly incorporated by reference herein in their entireties.

BACKGROUND

Field

The present disclosure relates generally to communication systems, and more specifically to the delivery of control channel information in a communication system.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. For example, the apparatus may be a UE. In various aspects, the apparatus may receive information from an eNB for receiving and processing an enhanced physical downlink control channel (ePDCCH). In one aspect, the apparatus receives a message via an enhanced physical control format indicator channel (ePCFICH) indicating the resources for the ePDCCH, the ePDCCH being at least one of a localized ePDCCH or a distributed ePDCCH. The apparatus processes the ePDCCH using the message. For example, the received message may include at least one ePCFICH value, and the apparatus may split a search space between the localized ePDCCH and distributed ePDCCH based on the at least one ePCFICH value. As another example, the apparatus may receive at least one physical control format indicator channel (PCFICH) value and may split a search space between a physical downlink control channel (PDCCH) and the ePDCCH based on the at least one PCFICH value and the at least one ePCFICH value.

In an aspect, the apparatus may receive an ePCFICH in a downlink (DL) signal from an eNB, the ePCFICH being a function of at least a physical cell identifier (PCI) or a virtual cell identifier, wherein the virtual cell identifier is not based on the PCI. The apparatus may process an ePDCCH in the DL signal using the received ePCFICH.

In an aspect, the apparatus may receive a DL signal from an eNB and may process an ePDCCH using a default set of resources when an ePCFICH is not detected in the DL signal.

In an aspect, the apparatus may receive at least one ePCFICH value and may determine either a starting symbol index for an ePDCCH or one or more ePDCCH resource sets based at least on the received at least one ePCFICH value. For example, the apparatus may further determine a number of ePDCCH resource sets, a size of at least one ePDCCH resource set, a location of at least one ePDCCH resource, and/or an ePDCCH transmission mode for at least one ePDCCH resource set.

In an aspect of the disclosure, a method, a computer program product, and an apparatus are provided. For example, the apparatus may be an eNB. The eNB may configure an ePDCCH as a unicast or a broadcast transmission, allocate a first antenna port for an ePCFICH and a second antenna port for an ePDCCH based on whether the ePDCCH is configured for a unicast transmission or a broadcast transmission, and transmit the ePCFICH and the ePDCCH based on the allocation. The eNB may transmit the ePCFICH using the first antenna port and may transmit the ePDCCH using the second antenna port. For example, the first antenna port may be different from the second antenna port when the ePDCCH is configured as a unicast transmission.

DETAILED DESCRIPTION

Figure 1:
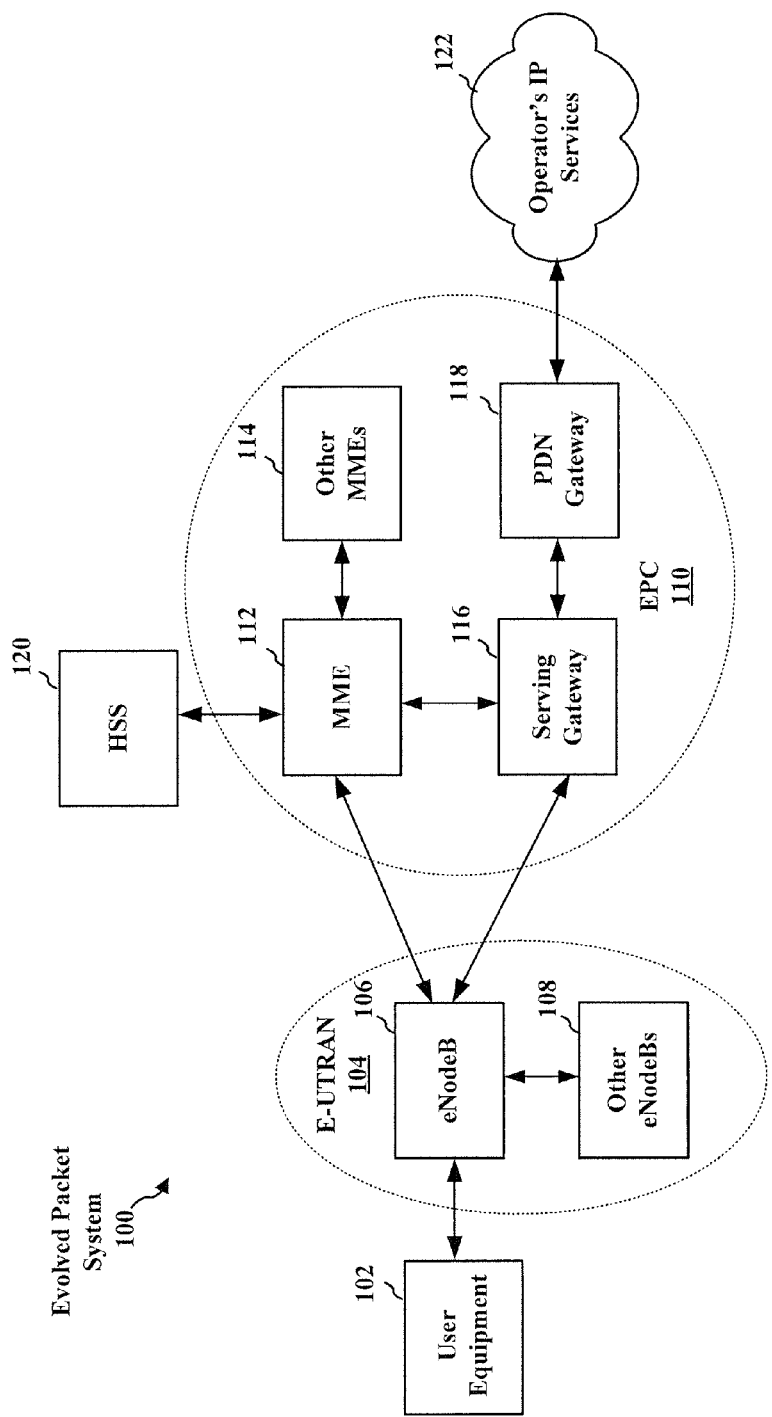
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110 (e.g., via an S1 interface). The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
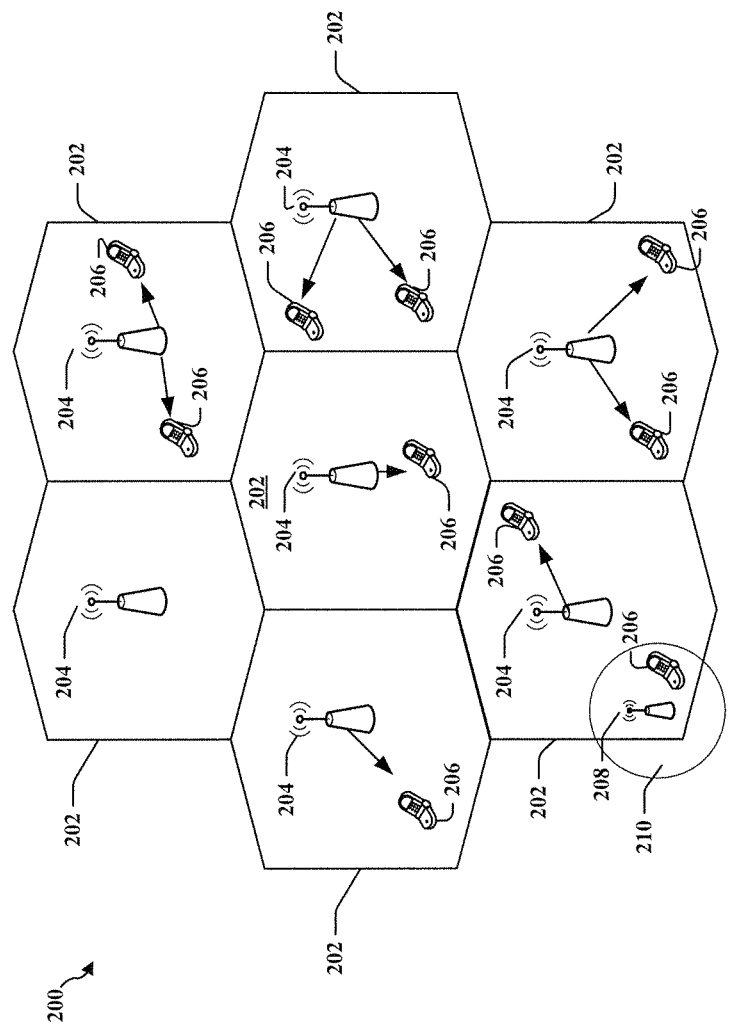
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
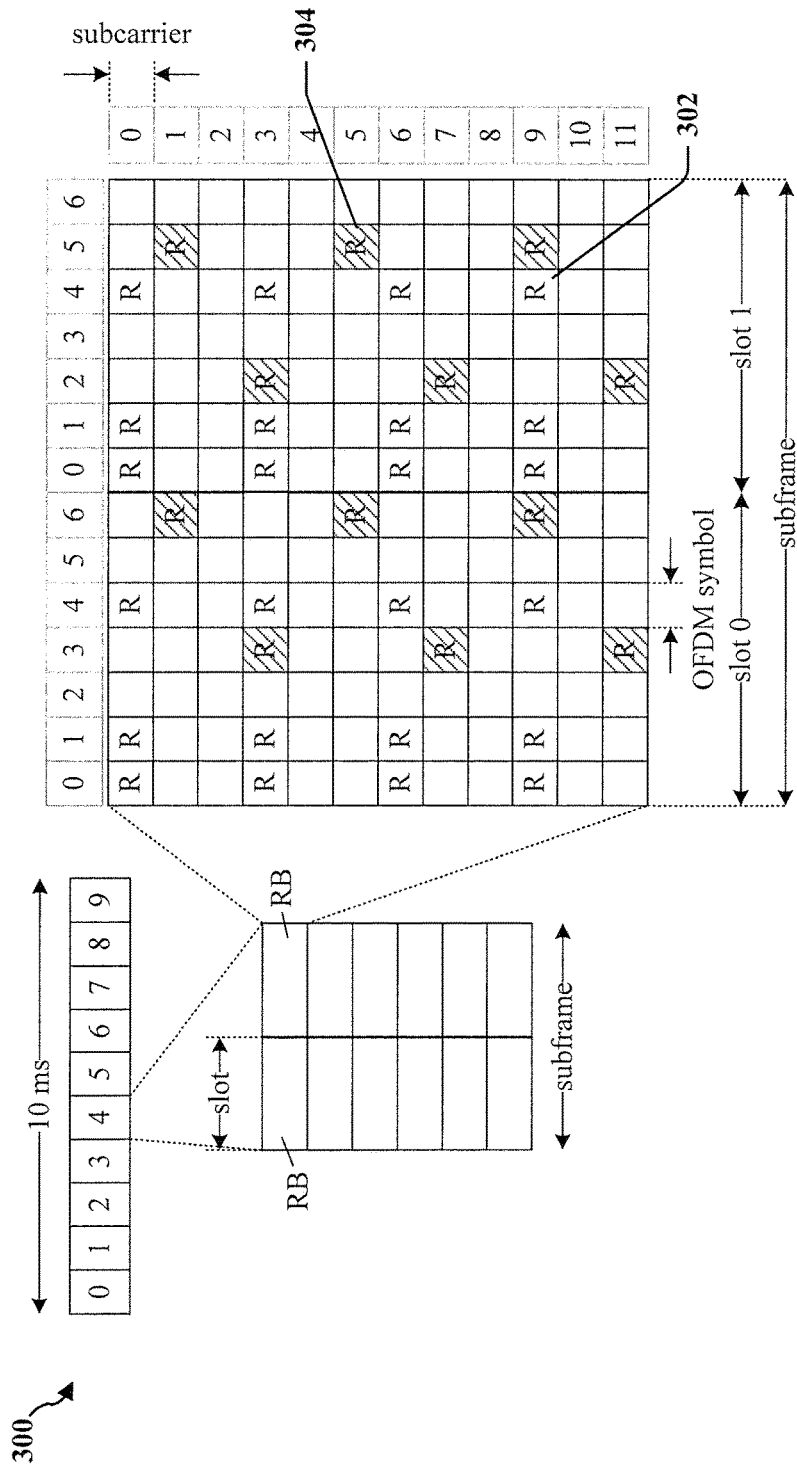
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
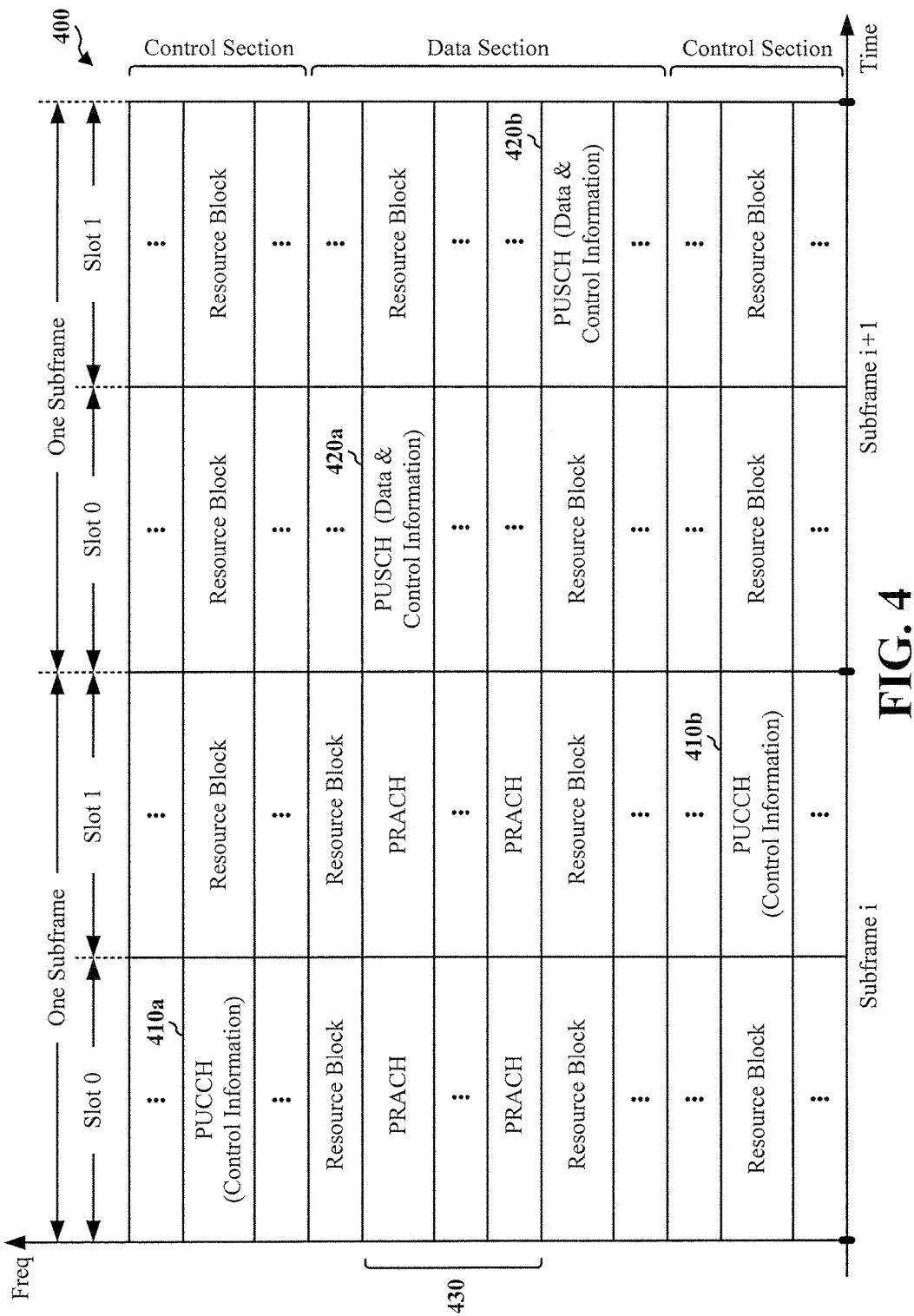
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
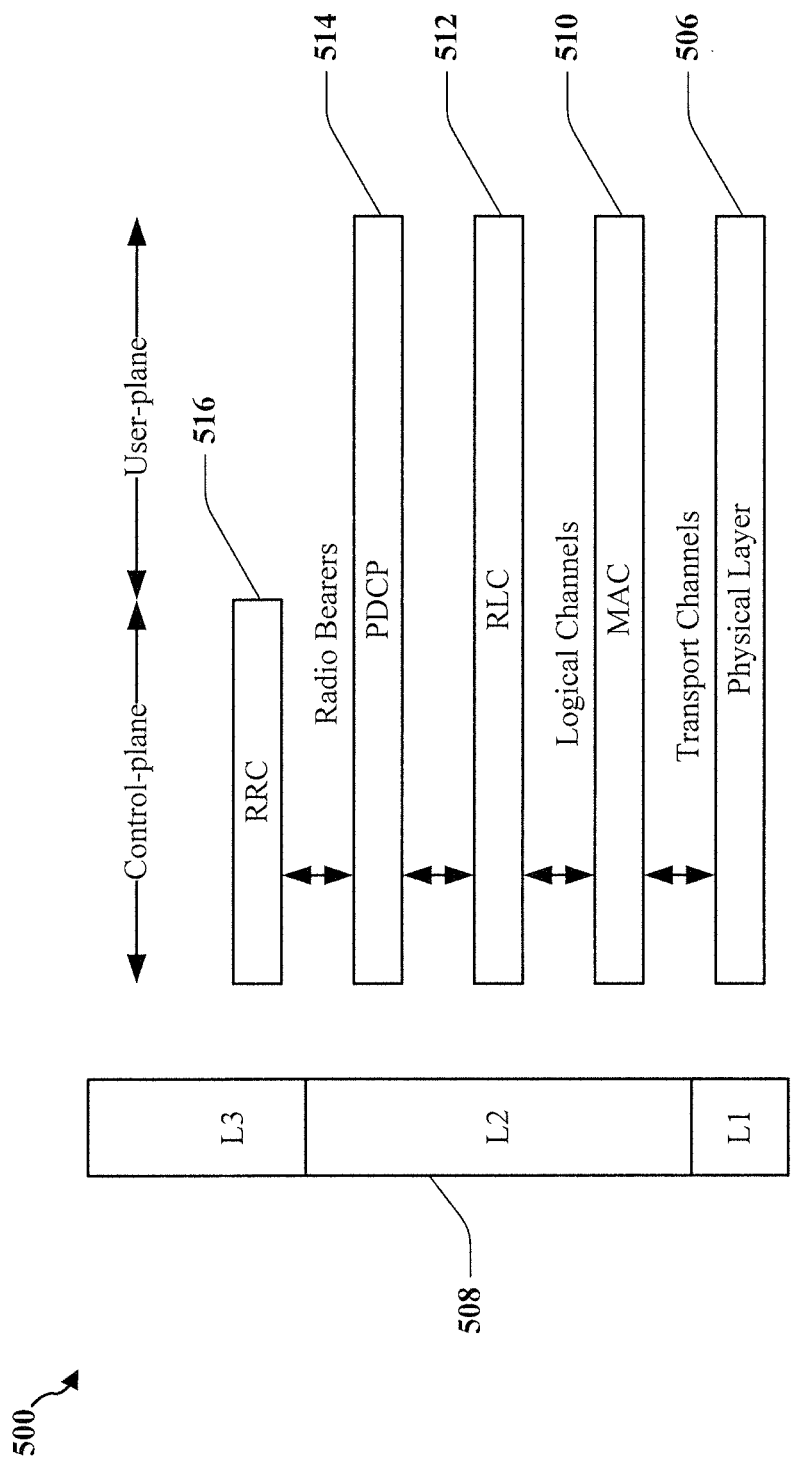
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
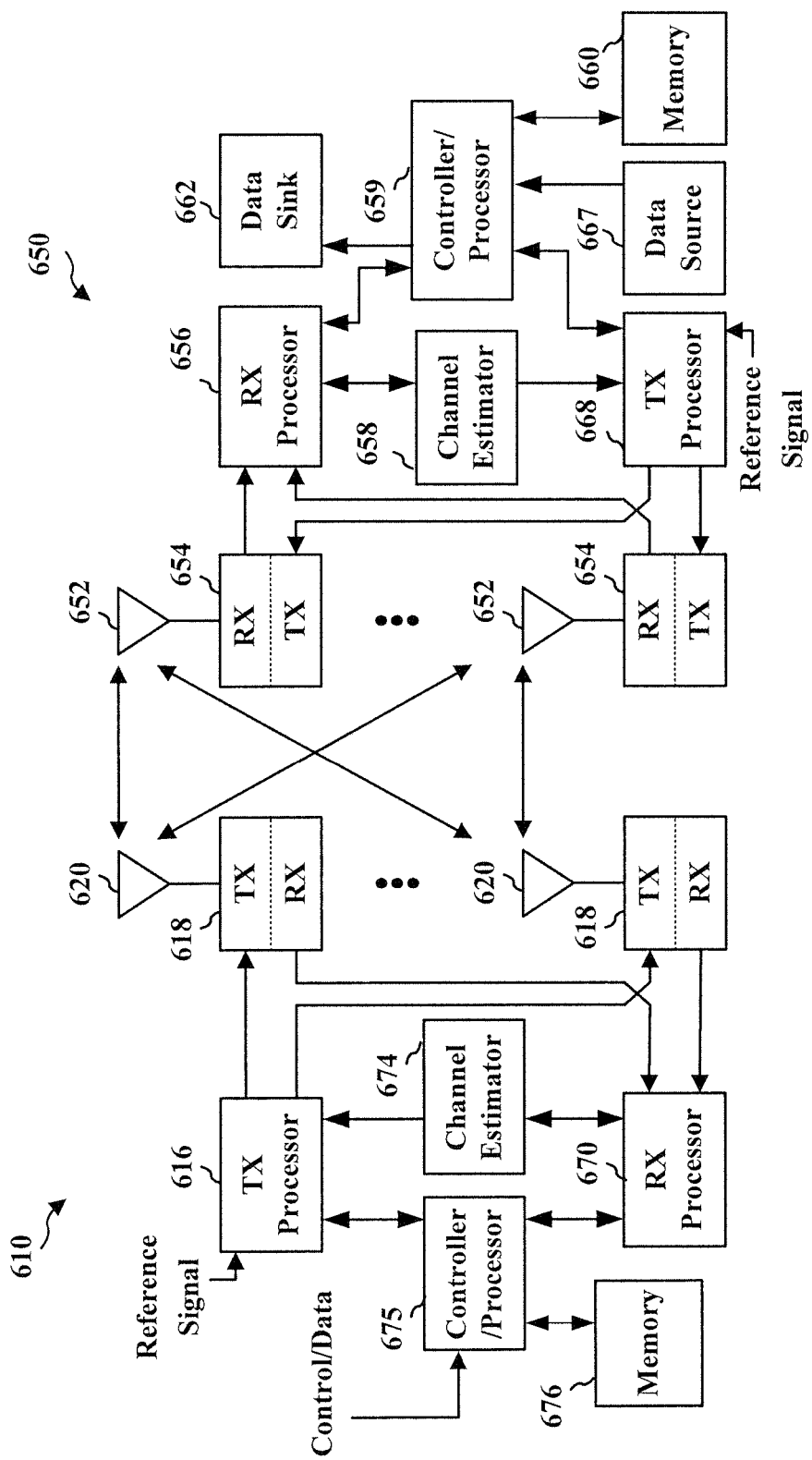
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
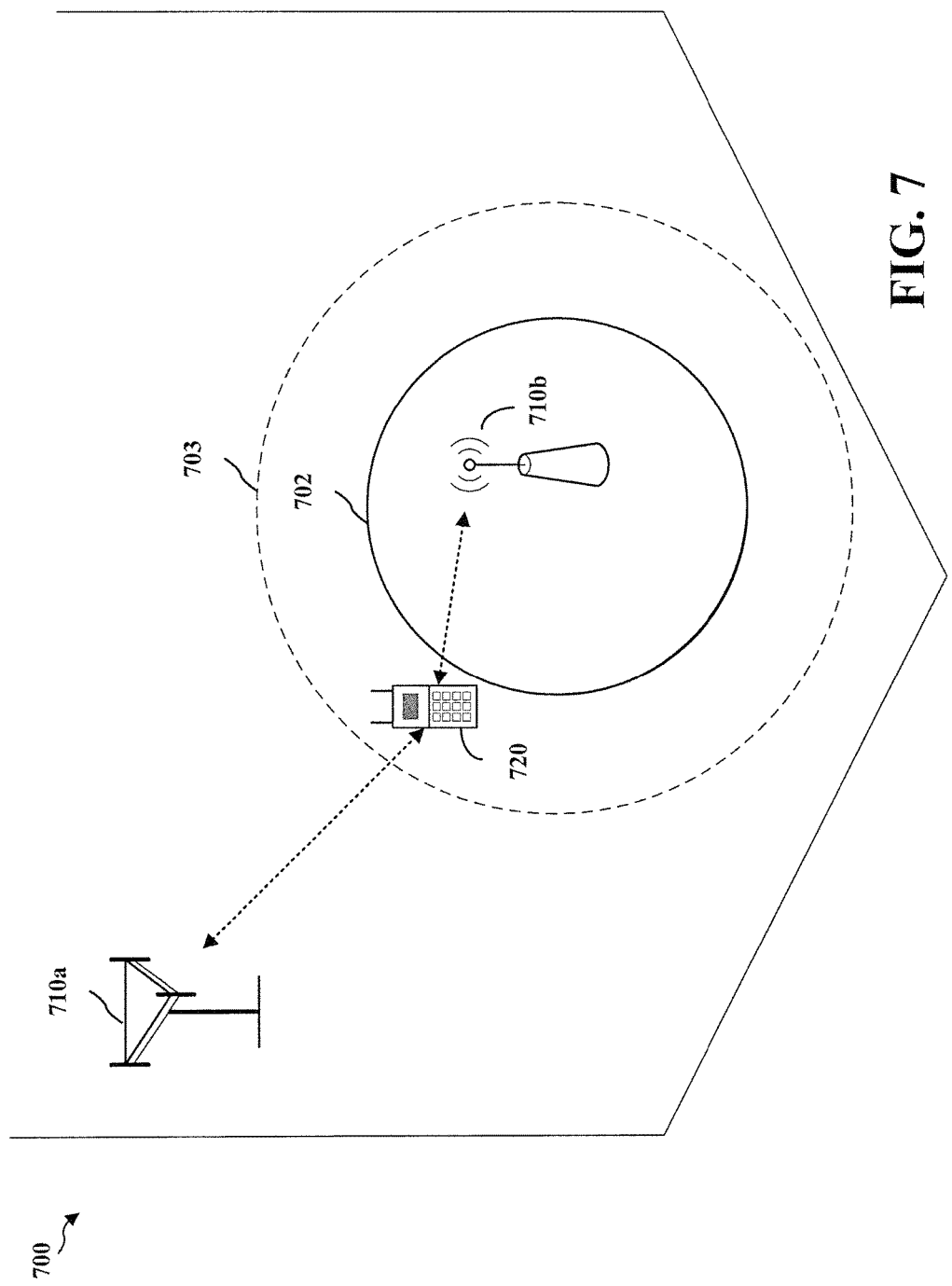
FIG. 7 is a diagram illustrating a range expanded cellular region in a heterogeneous network.

FIG. 7 is a diagram 700 illustrating a range expanded cellular region in a network. In an aspect, the network may be a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancellation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

In LTE Releases 8/9/10, a PDCCH is located in a first several symbols in a subframe. PDCCHs are fully distributed in the entire system bandwidth and are time domain multiplexed with the PDSCH. Effectively, a subframe is divided into a control region and a data region.

In LTE Release 11, a new control channel, such as an enhanced PDCCH (hereinafter "ePDCCH") will be introduced. Unlike the legacy PDCCH, which occupies the first several control symbols in a subframe, ePDCCH will occupy the data region in a subframe, similar to PDSCH. The ePDCCH may increase control channel capacity, support frequency-domain ICIC, achieve improved spatial reuse of control channel resource, support beamforming and/or diversity, operate on the new carrier type and in MBSFN subframes, and/or coexist on the same carrier as legacy UEs.

Both localized and distributed transmission of ePDCCH may be supported. In a distributed transmission of an ePDCCH, the ePDCCH is distributed over multiple physical resource blocks (PRBs). Moreover, demodulation reference signal (DM-RS) based ePDCCH may be supported, for example, using antenna ports 107, 108, 109, and 110. It should be noted that PDSCH is typically configured to use antenna ports 7-14. EPDCCH is based on frequency division multiplexing (FDM) and, therefore, may span both first and second slots with a restriction on the maximum number of transport channel (TrCH) bits receivable in a transmission time interval (TTI). The restriction may allow a relaxation of the processing requirements for the UE. For example, the restriction on the maximum number of TrCH bits receivable in a TTI may depend on UE capability or whether a condition is satisfied (e.g., when RTT>100 us). Multiplexing of PDSCH and ePDCCH within a PRB pair is not permitted. The same scrambling sequence generator defined for PDSCH DM-RS is used for ePDCCH DM-RS. For example, the scrambling sequence generator of DM-RS for ePDCCH on ports 107-110 may be initialized using equation (1):

$$c_{init}=(\lfloor n_s/2 \rfloor+1)\cdot(2X+1)\cdot 2^{16}+n_{SCID} \qquad \text{(equation 1)}$$

where $c_{init}$ represents an initialization value, $n_s$ represents a slot number within a radio frame, X represents a candidate value, and $n_{SCID}$ represents a scrambling identifier.

In LTE Release 11, coordinated multipoint transmission (CoMP) schemes are to be supported, which refers to schemes where multiple base stations coordinate transmissions (DL CoMP) to or receptions (UL CoMP) from one or more UEs. DL CoMP and UL CoMP may be separately or jointly enabled for a UE. The CoMP schemes may include, for example, joint transmission (JT) (DL CoMP) where multiple eNBs transmit the same data meant for a UE, joint reception (JR) (UL CoMP) where multiple eNBs receive the same data meant for a UE, coordinated beamforming (CBF) where an eNB transmits to a UE using beams that are chosen to reduce interference to UEs in neighboring cells, and dynamic point(s) selection (DPS) where the cell(s) involved in data transmissions may change from subframe to subframe.

CoMP may exist in homogeneous networks and/or heterogeneous networks (HetNet). The connection between the nodes involved in CoMP may be based on X2 protocols (some latency, limited bandwidth) or fiber (min latency and "unlimited" bandwidth). In HetNet CoMP, low power nodes may be referred to as a remote radio head (RRH).

To improve CoMP operation, PDSCH DM-RS sequence initialization may be based on some virtual cell IDs using equation 1, rather than being based on the PCI as in LTE Releases 8/9/10. Accordingly, with reference to equation 1, two candidate values of X (e.g., x(0) and x(1)) are configured, as compared to the PCI in LTE Releases 8/9/10. In one configuration, nSCID is reused for dynamic selection of x(0) or x(1) only for rank 1 and 2. It should be noted that nSCID is zero for the rank larger than 2 and when x(0) is used. For example, the value range of x(n) (0<=n<2) may be from zero to 503.

In LTE Releases 8/9/10/11, a physical control format indicator channel (PCFICH) carries a Control Format Indicator (CFI) which indicates the number of OFDM symbols used for transmission of downlink control channel information in each subframe. For example, in cases where large bandwidths are involved, the CFI may indicate 1, 2, and 3 symbols for non-MBSFN subframes, and 1 and 2 symbols for MBSFN subframes. The number of symbols may also depend on the number of CRS ports. For example, in cases where small bandwidths are involved, the CFI may indicate 2, 3, and 4 symbols for MBSFN subframes. Therefore, the PCFICH indicates the control region size in terms of a number of symbols. Dynamic control region indication via PCFICH provides efficient DL overhead management on a per subframe basis. Based on the actual load and other conditions, the eNB can adjust control region size on a per subframe basis, possibly maximizing the amount of resources for PDSCH.

Figure 8:
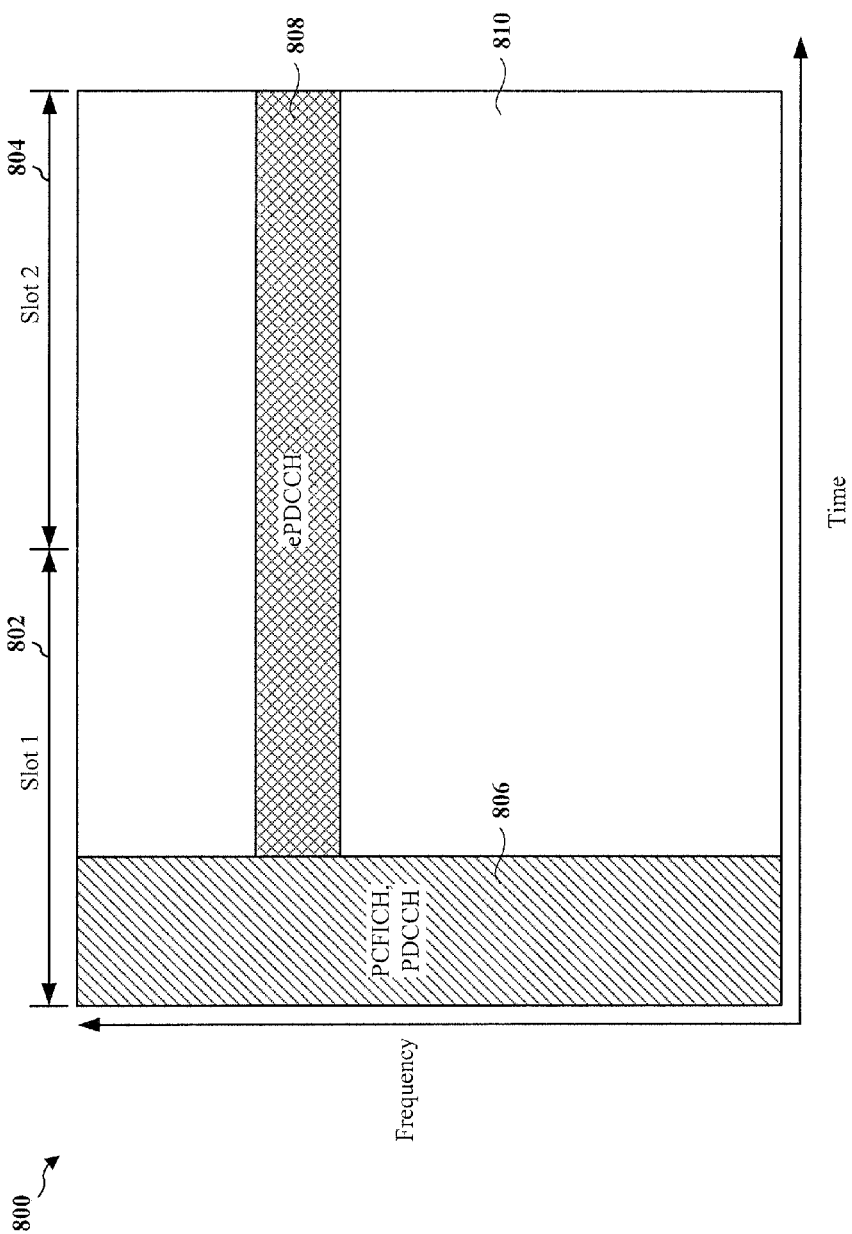
FIG. 8 is a diagram illustrating a subframe.

FIG. 8 is a diagram illustrating a subframe 800. In an aspect, the subframe 800 may be transmitted in a DL signal from an eNB (e.g., eNB 710a in FIG. 7) to a UE (e.g., UE 720 in FIG. 7). As shown in FIG. 8, the subframe 800 includes a slot 1 802 and a slot 2 804. In an aspect, the subframe 800 may include an ePCFICH in the region 806 and/or the region 810 of the subframe 800. For example, the ePCFICH may indicate the amount of resources reserved for ePDCCH, such as ePDCCH 808. In an aspect, the region 810 of the subframe 800 may include a PDSCH (not shown in FIG. 8). In one aspect, region 806 may further include a PCFICH and/or a PDCCH. In another aspect, the subframe 800 may not include any legacy control region (e.g., region 806 including PCFICH and/or a PDCCH) when subframe 800 is configured for a new carrier type.

In one configuration, the ePCFICH in region 806 may indicate the amount of resources reserved for both localized and distributed ePDCCH. In an aspect, the ePCFICH value may be a 2-bit value that indicates any one of the following four bracketed resources: {resource set 1 for localized ePDCCH, resource set 2 for distributed ePDCCH}, {resource set 3 for localized ePDCCH, resource set 4 for distributed ePDCCH}, {resource set 5 for localized ePDCCH}, or {resource set 6 for distributed ePDCCH}. In one example, if the 2-bit ePCFICH value is set to "00", a UE may understand that the 2-bit ePCFICH value indicates resource set 1 for localized ePDCCH and resource set 2 for distributed ePDCCH. In another example, if the 2-bit ePCFICH value is set to "01", a UE may understand that the 2-bit ePCFICH value indicates resource set 3 for localized ePDCCH and resource set 4 for distributed ePDCCH.

Therefore, the ePCFICH in region 806 may be configured to indicate resources for both localized and distributed ePDCCH, in addition to being able to indicate a resource for a distributed ePDCCH only, a resource for a localized ePDCCH only, or having two ePCFICHs, where one ePCFICH indicates a resource for distributed ePDCCH only and the other indicates a resource for a localized ePDCCH only.

In an aspect, since ePCFICH in region 806 is for broadcast (or groupcast), and ePDCCH 808 may be for unicast, the antenna ports for ePDCCH 808 and ePCFICH may be different. In one configuration, when ePCFICH is multiplexed with distributed ePDCCH, distributed ePDCCH may use one of the antenna ports 107, 108, 109, and 110, and ePCFICH may use antenna port 111. In another configuration, one of the antenna ports in 107, 108, 109, and 110 not being used by ePDCCH, may be reused. For example, ePDCCH may use port 107, and ePCFICH may use port 109. Such a configuration allows multiplexing ePCFICH with PDSCH. In yet another configuration, the same antenna port defined for ePCFICH may be reused for broadcast ePDCCH or ePDCCH in a common search space.

When a UE 720 is required to monitor localized and distributed ePDCCH from eNB 710a in one subframe, the search space of the UE 720 may be split between the localized and distributed ePDCCH. For example, the UE 720 may be required in total to decode {6, 6, 2, 2} decoding candidates for aggregation levels {1, 2, 4, 8} respectively. For example, the split between localized and distributed ePDCCH may be {6, 6, 2} with levels {1, 2, 4}, respectively, for localized and 2 decoding candidates of level 8 for distributed. As another example, the split between localized and distributed ePDCCH may be {3, 3, 1, 1} with levels {1, 2, 4, 8} respectively for localized or distributed.

In an aspect, the split between localized and distributed ePDCCH may depend further on ePCFICH values. In one configuration, if the UE 720 does not decode ePCFICH, a default split may be used. For example, the UE may only monitor localized ePCFICH assuming {6, 6, 2, 2} of levels {1, 2, 4, 8}. In another configuration, if the UE decodes a larger ePCFICH, the UE may have more decoding candidates for distributed ePDCCH.

In an aspect, a starting symbol index for ePDCCH may further depend on ePCFICH values. As an example, ePDCCH may start from the $1^{st}$, $2^{nd}$, $3^{rd}$ or $4^{th}$ symbol. The possible starting symbol indices for ePDCCH may further depend on whether a carrier is of a legacy type or a new type. As an example, for a legacy type carrier, the starting symbol for ePDCCH can be $2^{nd}$, $3^{rd}$, $4^{th}$ or $5^{th}$, while for a new type carrier, the starting symbol for ePDCCH can be $1^{st}$, $2^{nd}$, $3^{rd}$ and $4^{th}$. The possible starting symbol indices for ePDCCH may also be subframe dependent. As an example, the starting symbol for ePDCCH in a multi-cast broadcast single-carrier frequency network (MBSFN) subframe may be limited to only $1^{st}$, $2^{nd}$, and $3^{rd}$ symbols. The set of possible starting symbol indices for ePDCCH may be pre-determined or configured by higher layers. The transmission of ePCFICH in a subframe may indicate a starting symbol index for the subframe. The transmission of ePCFICH in a subframe may also indicate a starting symbol index for a different subframe (e.g., if the two subframes are of similar or the same interference conditions). The indicated ePDCCH starting symbol index by ePCFICH may further be overwritten by a value indicated by another signal. As an example, in a subframe of a legacy carrier type, a UE may determine, e.g., by a higher layer signalling, that the starting symbol index of ePDCCH is based on the detection of a legacy PCFICH. In this case, the UE may ignore the indicated starting symbol index by ePCFICH. Alternatively, ePCFICH in this case may not carry any information related to the starting symbol index of ePDCCH.

In an aspect, the starting symbol of ePDCCH and the starting symbol of ePCFICH may not be the same. As an example, the starting symbol of ePCFICH may be fixed at a specific symbol, while the starting symbol of ePDCCH may be dynamically indicated by ePCFICH or PCFICH.

In an aspect, ePCFICH may contain information regarding one or more ePDCCH resource sets. As an example, ePCFICH may indicate the number of ePDCCH resource sets. As another example, ePCFICH may indicate the size and/or location of one or more ePDCCH resource sets. Each resource set may consist of a number of PRB pairs. The size of each ePDCCH resource set may be pre-determined or configured by higher layers. The sizes of different ePDCCH resource sets may or may not be the same. Each resource set may be associated with an ePDCCH transmission mode, e.g., localized ePDCCH or distributed ePDCCH. As an example, all or part of information regarding the number of ePDCCH resource sets, the location and/or size of each resource set, and the ePDCCH transmission mode of each resource set can be jointly coded and indicated by ePCFICH.

In an aspect, when a UE is required to monitor legacy PDCCH and ePDCCH in one subframe, a UE's search space may be split between legacy PDCCH and ePDCCH. The split may depend further on legacy PCFICH values and/or ePCFICH values.

In an aspect, ePCFICH may be a function of the actual PCI. In one configuration, ePCFICH may be a function of a virtual cell ID, separately configured from the PCI. In such a configuration, the virtual cell ID for ePCFICH may be configured separately from a virtual cell ID configured for ePDCCH and/or PDSCH, at least for unicast traffic. The virtual cell ID for ePCFICH may be the same for ePDCCH and/or PDSCH for broadcast traffic.

In an aspect, an eNB may omit ePCFICH in some subframes and the UE may assume a default set of resources for ePDCCH when ePCFICH is not detected. As an example, the default set of resources for ePDCCH may be the resources specified for ePDCCH common search space. As an example, the default set of resources for ePDCCH may be common search space and the first set of the RRC configured multiple sets of ePDCCH resources.

Figure 9:
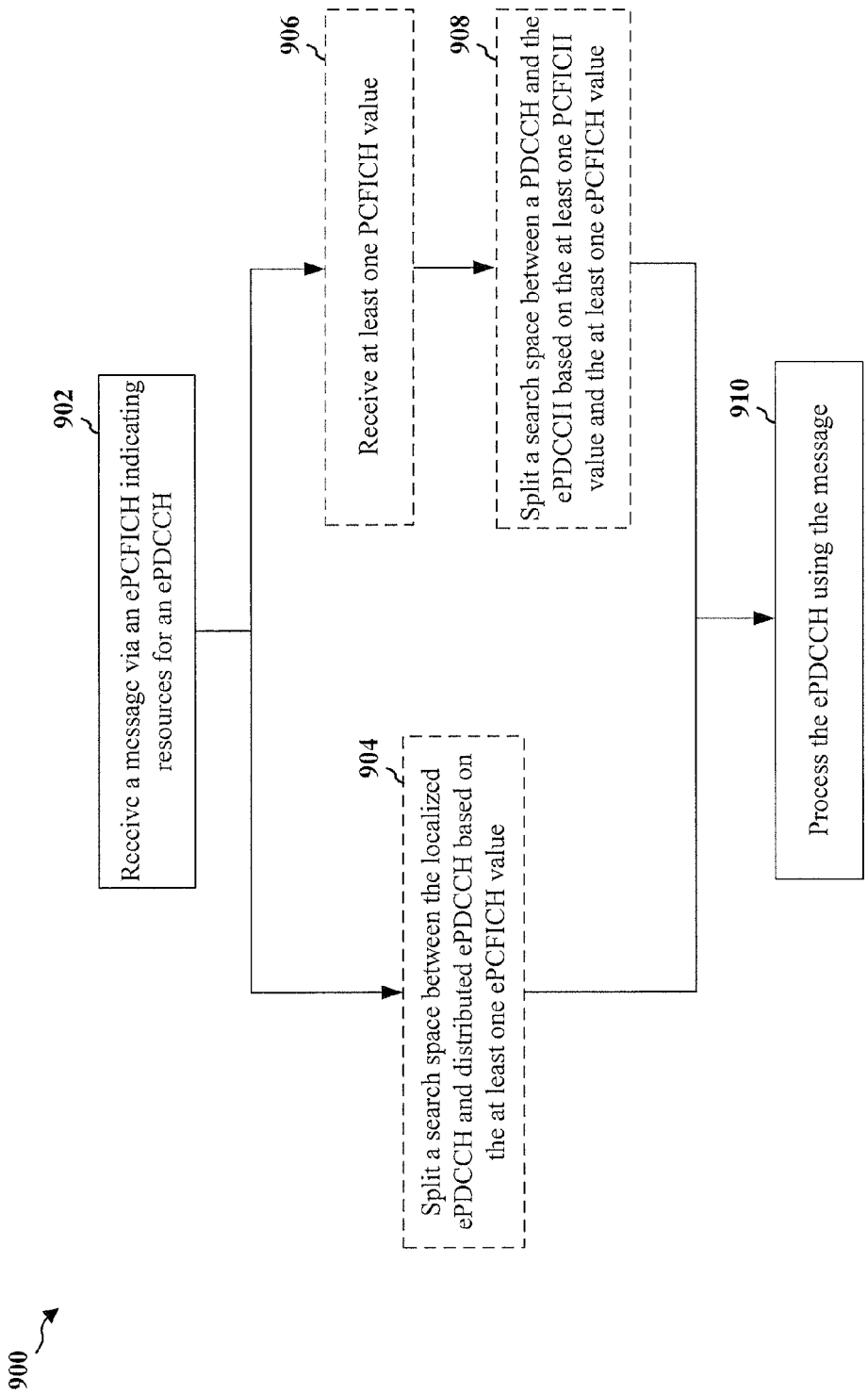
FIG. 9 is a flow chart of a method of wireless communication.

FIG. 9 is a flow chart 900 of a method of wireless communication. The method may be performed by a UE, such as UE 720. At step 902, the UE receives a message via an ePCFICH indicating resources for an ePDCCH, the ePDCCH being at least one of a localized ePDCCH or a distributed ePDCCH. In an aspect, the received message may include at least one ePCFICH value. In an aspect, the ePCFICH value may be a 2-bit value that indicates any one of the following four bracketed resources: {resource set 1 for localized ePDCCH, resource set 2 for distributed ePDCCH}, {resource set 3 for localized ePDCCH, resource set 4 for distributed ePDCCH}, {resource set 5 for localized ePDCCH}, or {resource set 6 for distributed ePDCCH}.

At step 904, the UE splits a search space between the localized ePDCCH and distributed ePDCCH based on the at least one ePCFICH value. For example, if the 2-bit ePCFICH value is set to "00", a UE may understand that the 2-bit ePCFICH value indicates resource set 1 for localized ePDCCH and resource set 2 for distributed ePDCCH.

At step 906, the UE receives at least one PCFICH value. At step 908, the UE splits the search space between a PDCCH and the ePDCCH based on the at least one PCFICH value and the at least one ePCFICH value.

At step 910, the UE processes the ePDCCH using the message. In an aspect, the UE processes the ePDCCH by locating the ePDCCH according to a set of resources (e.g., search spaces) indicated by a 2-bit ePCFICH value in the message and decoding the ePDCCH.

It should be understood that the steps 904, 906, and 908 indicated with dotted lines in FIG. 9 represent optional steps. For example, in an aspect, steps 902, 904, and 910 may be performed without performing steps 906 and 908. As another example, in an aspect, steps 902, 906, 908, and 910 may be performed without performing step 904.

Figure 10:
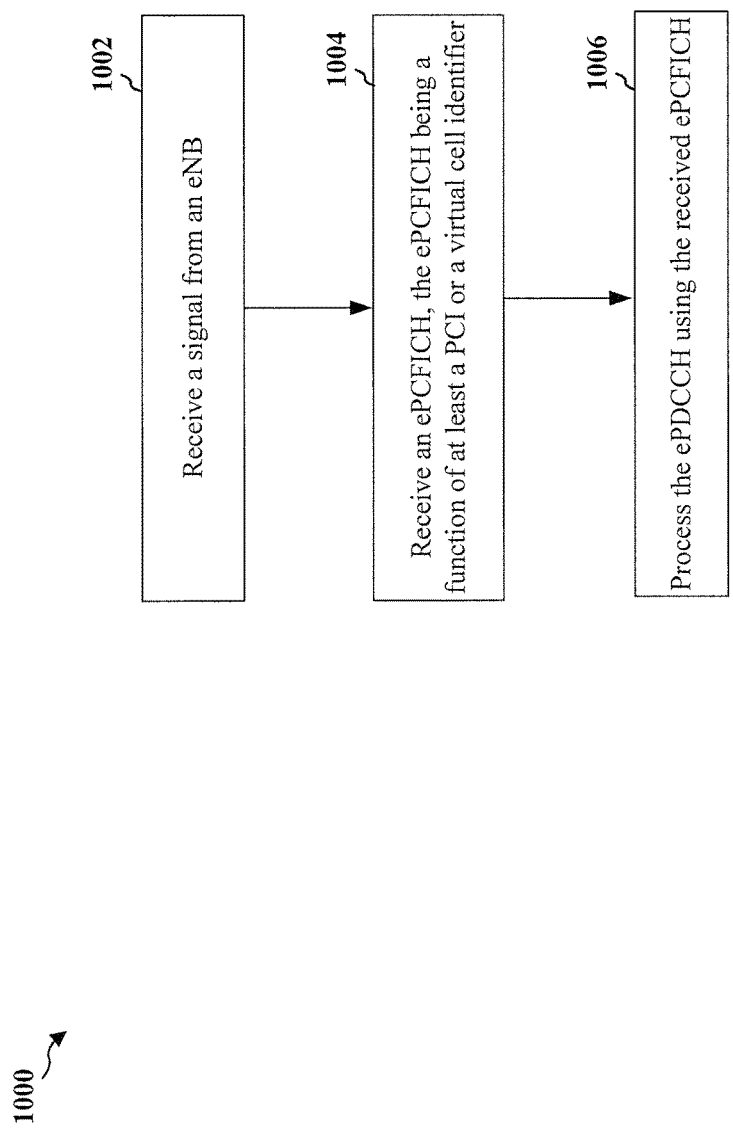
FIG. 10 is a flow chart of a method of wireless communication.

FIG. 10 is a flow chart 1000 of a method of wireless communication. The method may be performed by a UE, such as UE 720. At step 1002, the UE receives a signal from an eNB (e.g., eNB 710a). For example, the signal may be a DL signal.

At step 1004, the UE receives an ePCFICH through the DL signal. The ePCFICH may be a function of at least a PCI or a virtual cell identifier. In an aspect, the virtual cell identifier is configured separately from the PCI and, therefore, is not based on the PCI.

At step 1006, the UE processes an ePDCCH in the DL signal using the received ePCFICH. In an aspect, the UE processes the ePDCCH by locating the ePDCCH according to a set of resources (e.g., search spaces) indicated by the ePCFICH and decoding the ePDCCH.

Figure 11:
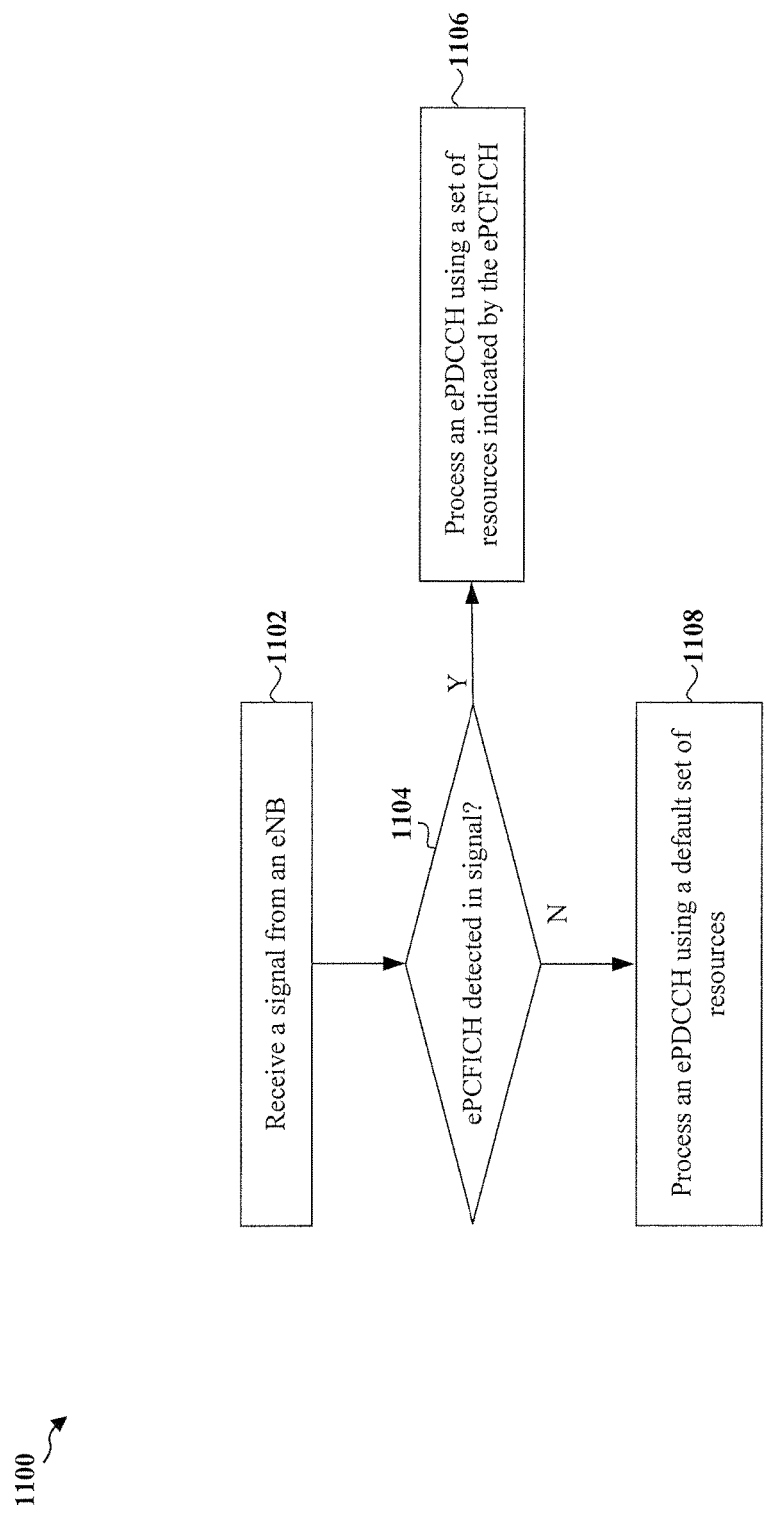
FIG. 11 is a flow chart of a method of wireless communication.

FIG. 11 is a flow chart 1100 of a method of wireless communication. The method may be performed by a UE, such as UE 720. At step 1102, the UE receives a signal from an eNB (e.g., eNB 710a). For example, the signal may be a DL signal.

At step 1104, the UE determines whether an ePCFICH is detected in the received DL signal. If the ePCFICH is detected in the received DL signal (1104), then at step 1106, the UE processes an ePDCCH using a set of resources indicated by the ePCFICH. In an aspect, the UE processes the ePDCCH by locating the ePDCCH according to the set of resources (e.g., search spaces) indicated by the ePCFICH and decoding the ePDCCH.

If the ePCFICH is not detected in the received DL signal (1104), then at step 1108, the UE processes the ePDCCH using a default set of resources. In an aspect, the default set of resources correspond to a set of resources specified for a common search space for ePDCCH. In an aspect, the UE processes the ePDCCH by locating the ePDCCH according to the default set of resources (e.g., search spaces) and decoding the ePDCCH.

Figure 12:
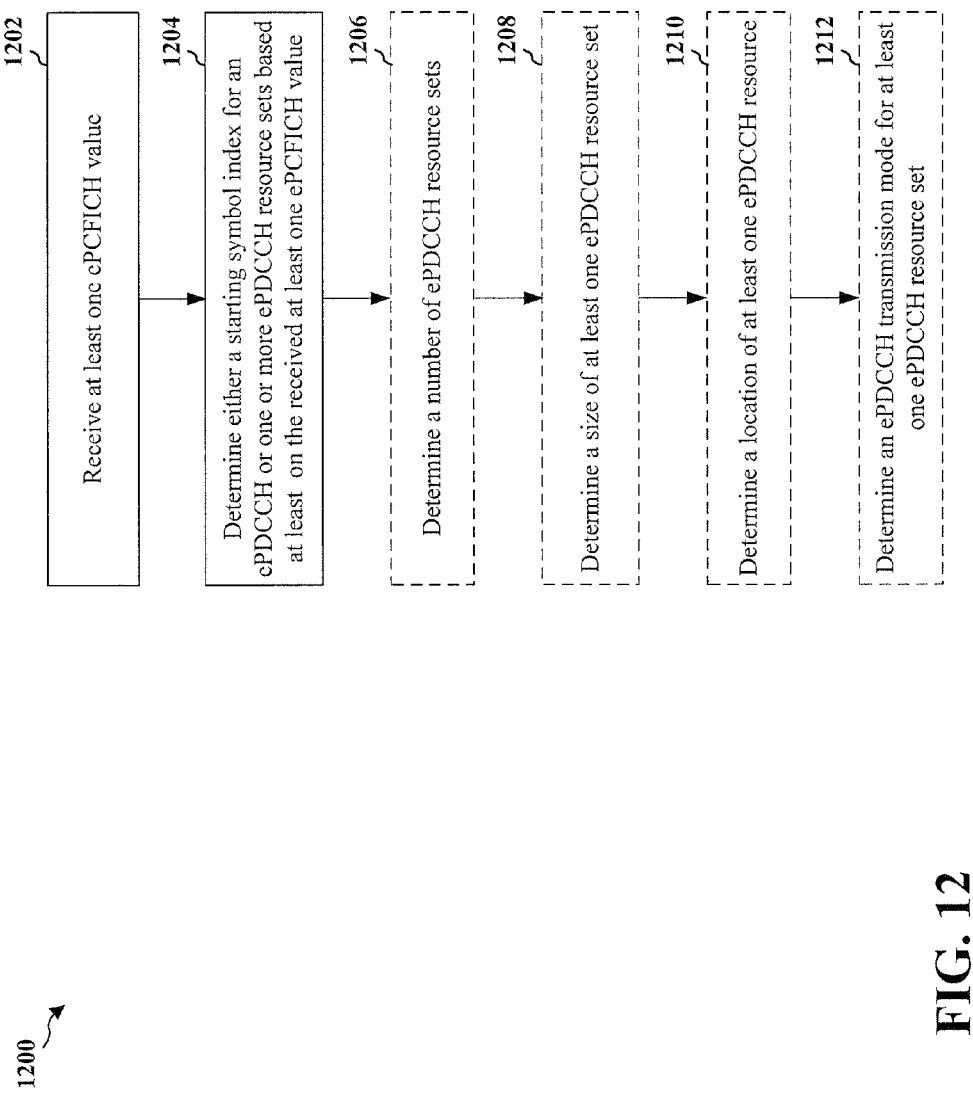
FIG. 12 is a flow chart of a method of wireless communication.

FIG. 12 is a flow chart 1200 of a method of wireless communication. The method may be performed by a UE, such as UE 720. At step 1202, the UE receives at least one ePCFICH value.

At step 1204, the UE determines either a starting symbol index for an ePDCCH or one or more ePDCCH resource sets based at least on the received at least one ePCFICH value. In an aspect, the value of the starting symbol index is further determined based on whether a carrier is of a legacy type or a new type. In another aspect, the value of the starting symbol index is further determined based on a subframe index. In another aspect, the value of the starting symbol index for ePDCCH is different from a starting symbol index for the received at least one ePCFICH.

At step 1206, when the UE determines one or more ePDCCH resource sets, the UE determines a number of ePDCCH resource sets.

At step 1208, when the UE determines one or more ePDCCH resource sets, the UE determines a size of at least one ePDCCH resource set.

At step 1210, when the UE determines one or more ePDCCH resource sets, the UE determines a location of at least one ePDCCH resource.

At step 1212, when the UE determines one or more ePDCCH resource sets, the UE determines an ePDCCH transmission mode for at least one ePDCCH resource set.

It should be understood that the steps 1206, 1208, 1210 and 1212 indicated with dotted lines in FIG. 12 represent optional steps. For example, in one embodiment, steps 1202 and 1204 may be performed without performing steps 1206, 1208, 1210 and/or 1212. As another example, in one embodiment, steps 1202 and 1204 may be performed in combination with one or more of optional steps 1206, 1208, 1210 and 1212.

Figure 13:
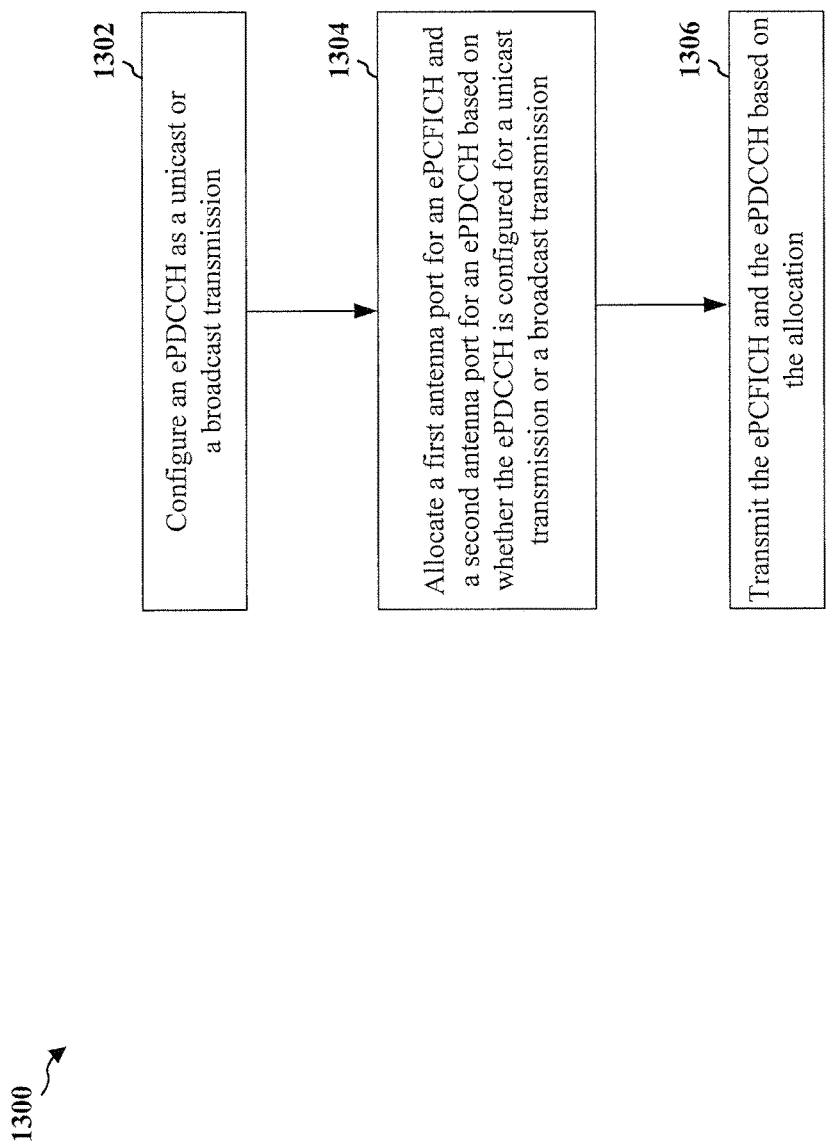
FIG. 13 is a flow chart of a method of wireless communication.

FIG. 13 is a flow chart 1300 of a method of wireless communication. The method may be performed by an eNB, such as eNB 710a. At step 1302, the eNB configures an ePDCCH as a unicast or a broadcast transmission.

At step 1304, the eNB allocates a first antenna port for an ePCFICH and a second antenna port for an ePDCCH based on whether the ePDCCH is configured for a unicast transmission or a broadcast transmission. In an aspect, the first antenna port is different from the second antenna port when the ePDCCH is configured as a unicast transmission.

At step 1306, the eNB transmits the ePCFICH and the ePDCCH based on the allocation. For example, the eNB may transmit the ePCFICH using the first antenna port and may transmit the ePDCCH using the second antenna port.

Figure 14:
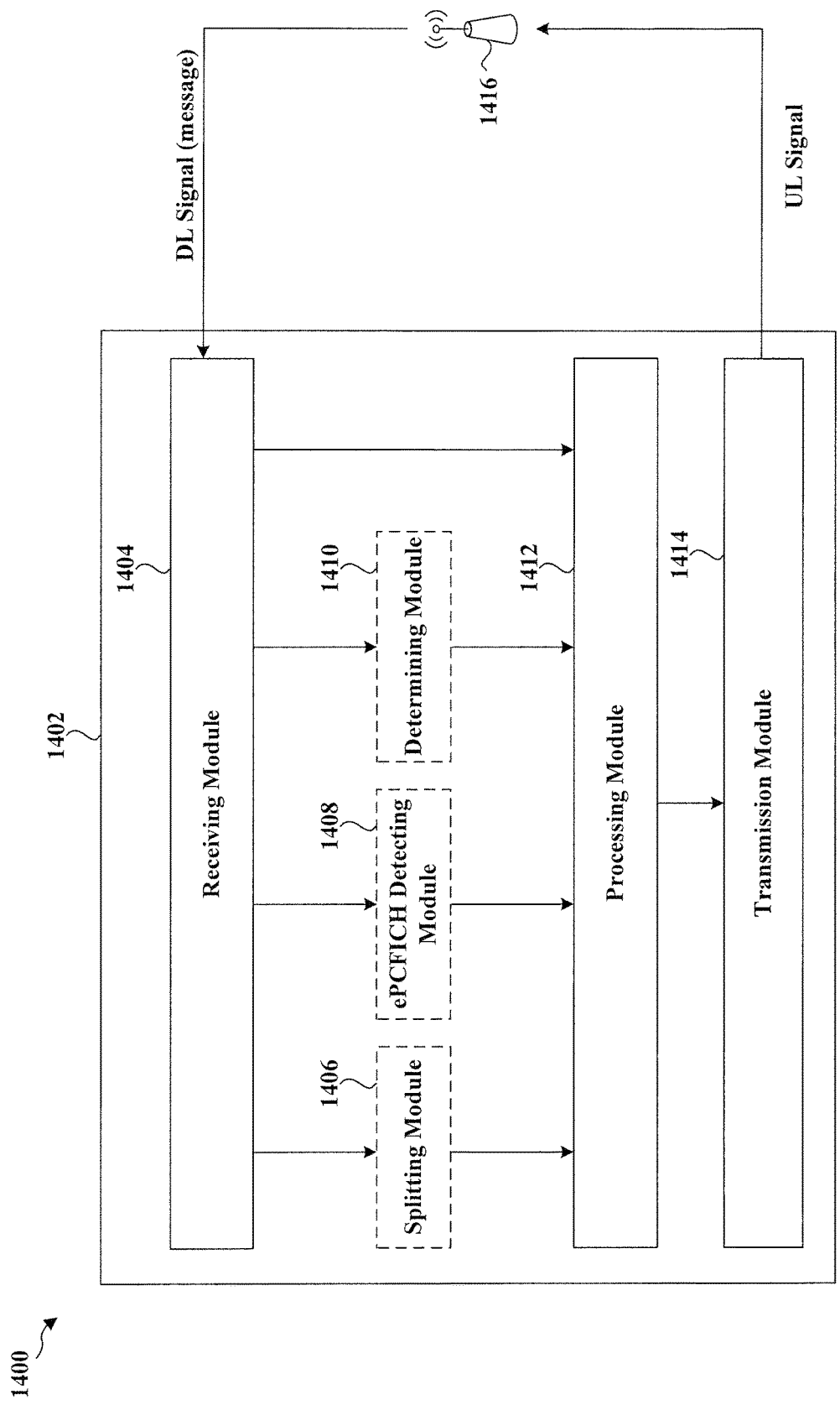
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a UE. The apparatus includes a module 1404 that receives a message from the eNB 1416 via an ePCFICH indicating resources for an ePDCCH, the ePDCCH being at least one of a localized ePDCCH or a distributed ePDCCH, receives at least one PCFICH value, receives an ePCFICH, where the ePCFICH is a function of at least a PCI or a virtual cell identifier, and where the virtual cell identifier is not based on the PCI, and receives at least one ePCFICH value. The apparatus further includes a module 1406 that splits a search space between the localized ePDCCH and distributed ePDCCH based on the at least one ePCFICH value and splits a search space between a PDCCH and the ePDCCH based on the at least one PCFICH value and the at least one ePCFICH value, a module 1408 that detects an ePCFICH in a DL signal from an eNB (e.g., eNB 710a), a module 1410 that determines either a starting symbol index for an ePDCCH or one or more ePDCCH resource sets based at least on the received at least one ePCFICH value, determines a number of ePDCCH resource sets, determines a size of at least one ePDCCH resource set, determines a location of at least one ePDCCH resource, and determines an ePDCCH transmission mode for at least one ePDCCH resource set, a module 1412 that processes the ePDCCH using the message and processes an ePDCCH using a default set of resources when an ePCFICH is not detected, and a module 1414 for transmitting UL signals.

The apparatus may include additional modules that perform each of the steps of the algorithm in the aforementioned flow charts of FIGS. 9-12. As such, each step in the aforementioned flow charts of FIGS. 9-12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
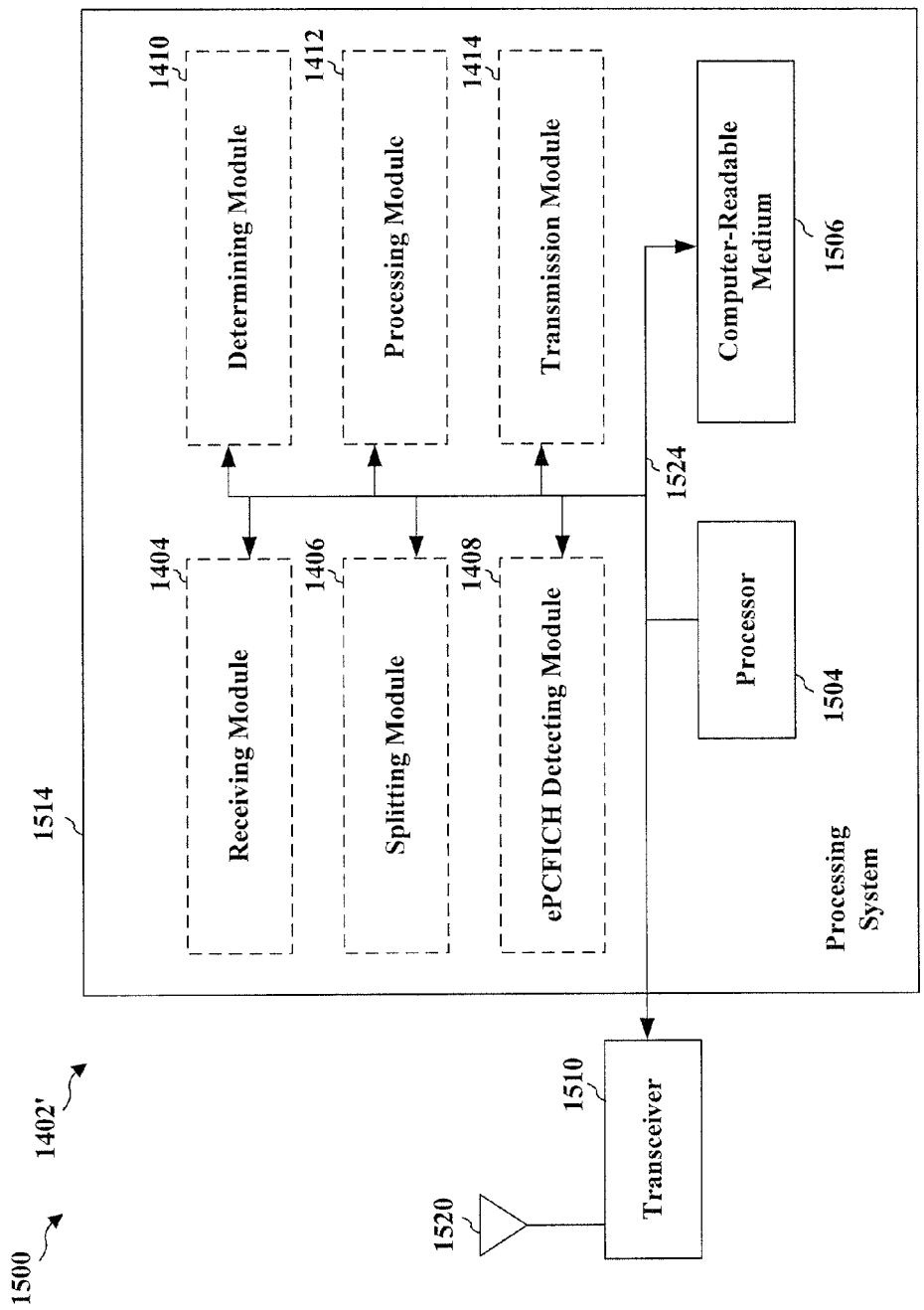
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, 1412, and 1414, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1404, 1406, 1408, 1410, 1412, and 1414. The modules may be software modules running in the processor 1504, resident/stored in the computer readable medium 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' for wireless communication includes means for receiving a message via an ePCFICH indicating resources for an ePDCCH, the ePDCCH being at least one of a localized ePDCCH or a distributed ePDCCH, means for processing the ePDCCH using the message, means for splitting a search space between the localized ePDCCH and distributed ePDCCH based on the at least one ePCFICH value, means for receiving at least one PCFICH value, means for splitting a search space between a PDCCH and the ePDCCH based on the at least one PCFICH value and the at least one ePCFICH value, means for receiving an ePCFICH, the ePCFICH being a function of at least a PCI or a virtual cell identifier, means for processing an ePDCCH using a default set of resources when an ePCFICH is not detected, means for receiving at least one ePCFICH value, and means for determining either a starting symbol index for an ePDCCH or one or more ePDCCH resource sets based at least on the received at least one ePCFICH value, means for determining a number of ePDCCH resource sets, means for determining a size of at least one ePDCCH resource set, means for determining a location of at least one ePDCCH resource, and means for determining an ePDCCH transmission mode for at least one ePDCCH resource set.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 16:
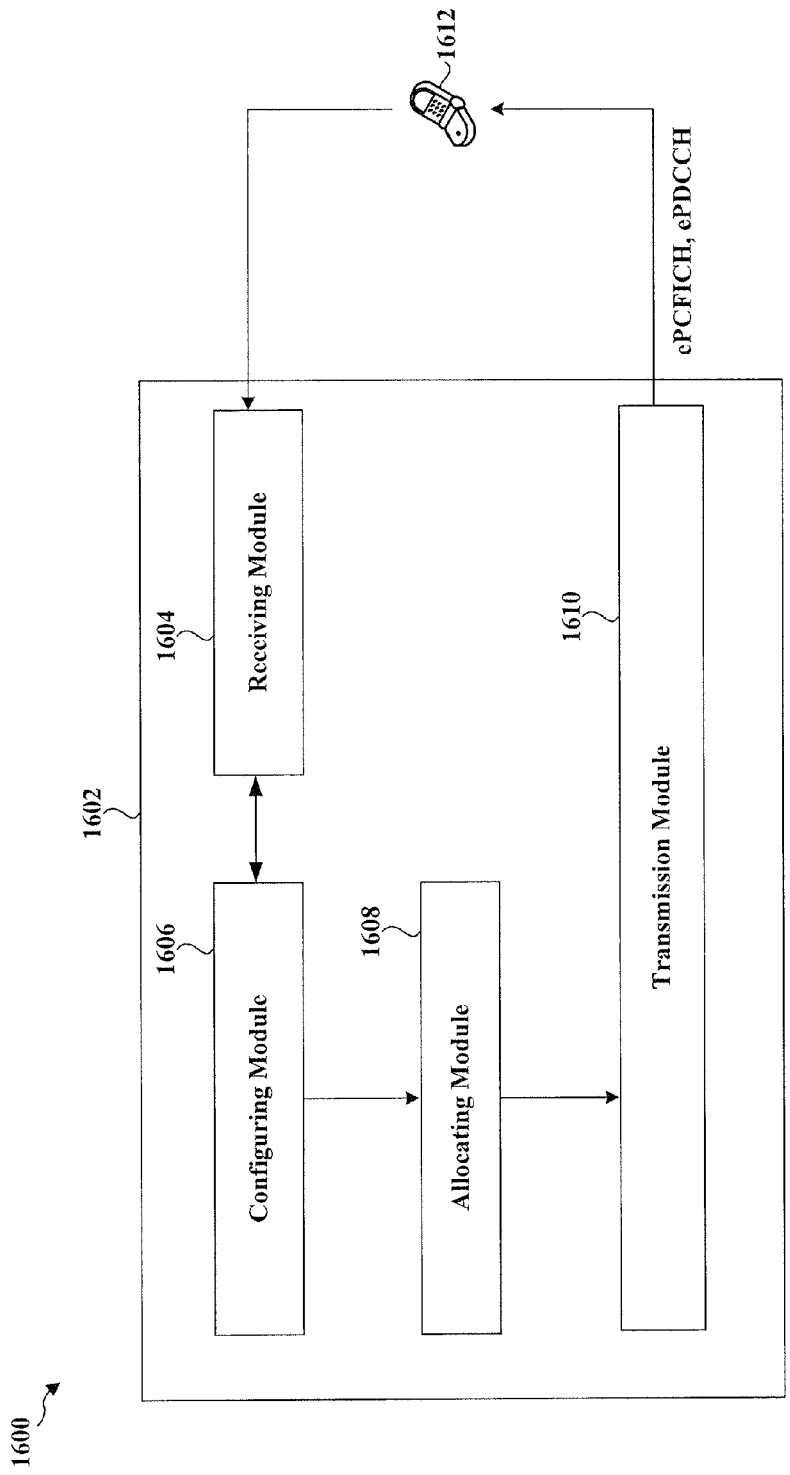
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 1602. The apparatus may be an eNB. The apparatus includes a module 1604 for receiving UL signals from UE 1612, a module 1606 that configures an ePDCCH as a unicast or a broadcast transmission, a module 1608 that allocates a first antenna port for an ePCFICH and a second antenna port for an ePDCCH based on whether the ePDCCH is configured for a unicast transmission or a broadcast transmission, and a module 1610 that transmits the ePCFICH and the ePDCCH to the UE 1612 based on the allocation The apparatus may include additional modules that perform each of the steps of the algorithm in the aforementioned flow chart of FIG. 13. As such, each step in the aforementioned flow chart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
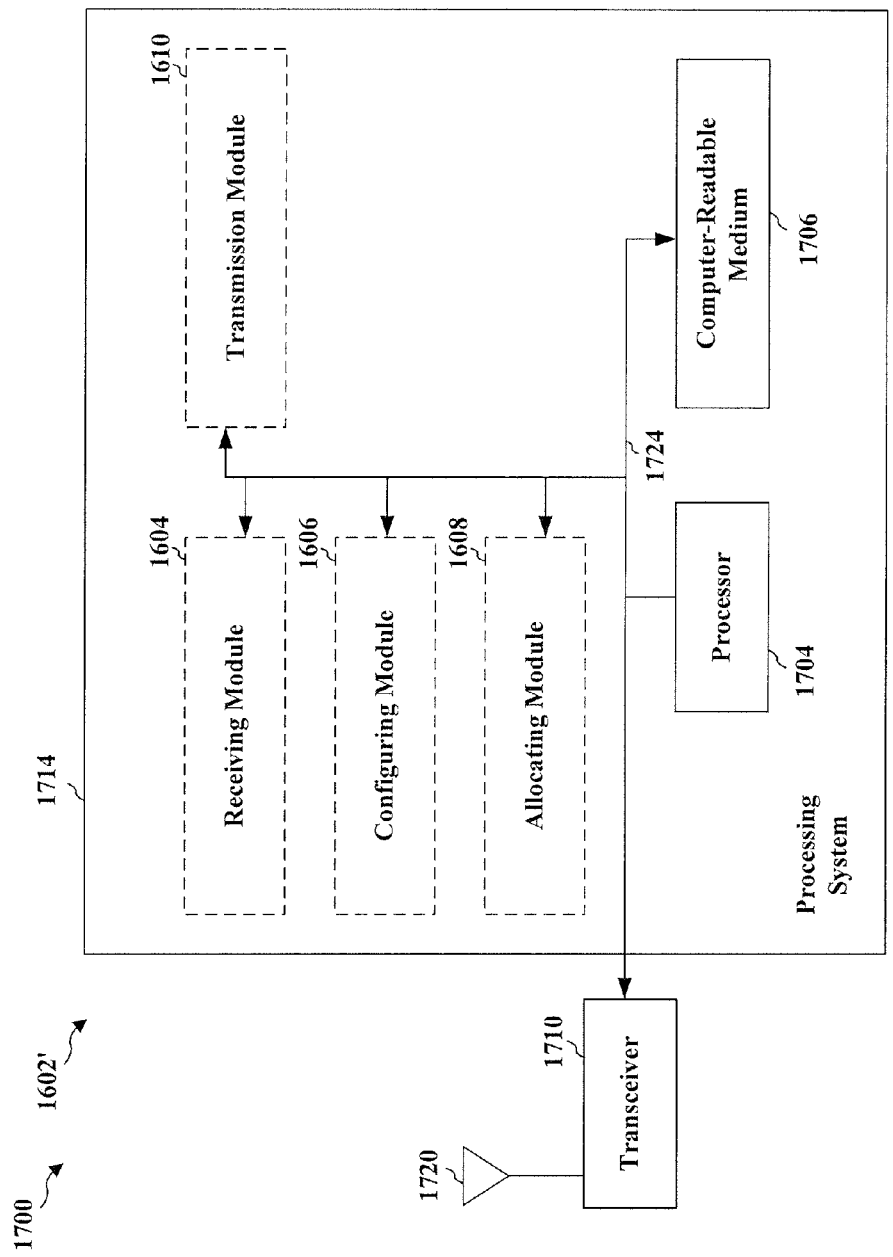
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1604, 1606, 1608, and 1610, and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes at least one of the modules 1604, 1606, 1608, and 1610. The modules may be software modules running in the processor 1704, resident/stored in the computer readable medium 1706, one or more hardware modules coupled to the processor 1704, or some combination thereof. The processing system 1714 may be a component of the eNB 610 and may include the memory 676 and/or at least one of the TX processor 616, the RX processor 670, and the controller/processor 675.

In one configuration, the apparatus 1602/1602' for wireless communication includes means for configuring an ePDCCH as a unicast or a broadcast transmission, means for allocating a first antenna port for an ePCFICH and a second antenna port for an ePDCCH based on whether the ePDCCH is configured for a unicast transmission or a broadcast transmission, and means for transmitting the ePCFICH and the ePDCCH based on the allocation.

The aforementioned means may be one or more of the aforementioned modules of the apparatus 1602 and/or the processing system 1714 of the apparatus 1602' configured to perform the functions recited by the aforementioned means. As described supra, the processing system 1714 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment (UE), the method comprising:
   receiving, at the UE, a message via an enhanced physical control format indicator channel (ePCFICH) indicating resources for an enhanced physical downlink control channel (ePDCCH),
   the message comprising at least one ePCFICH value indicating resources reserved for a localized ePDCCH and resources reserved for a distributed ePDCCH;
   splitting, at the UE, a search space between the localized ePDCCH and distributed ePDCCH based on the at least one ePCFICH value; and
   processing, at the UE, the ePDCCH using the message.

2. The method of claim 1, further comprising:
   receiving at least one physical control format indicator channel (PCFICH) value; and
   splitting a search space between a physical downlink control channel (PDCCH) and the ePDCCH based on the at least one PCFICH value and the at least one ePCFICH value.

3. The method of claim 1, wherein the ePCFICH is based on a function of at least a physical cell identifier (PCI) or a virtual cell identifier, wherein the virtual cell identifier is not based on the PCI.

4. The method of claim 1, further comprising:
   processing an enhanced physical downlink control channel (ePDCCH) using a default set of resources when an enhanced physical control format indicator channel (ePCFICH) is not detected.

5. The method of claim 4, wherein the default set of resources correspond to a set of resources specified for a common search space for ePDCCH.

6. The method of claim 1, further comprising:
  determining, at the UE, either a starting symbol index for the ePDCCH or one or more ePDCCH resource sets based at least on the received at least one ePCFICH value; and
  determining, at the UE, whether an ePDCCH transmission mode for at least one ePDCCH resource set comprises a localized ePDCCH transmission mode or a distributed ePDCCH transmission mode.

7. The method of claim 6, wherein a value of the starting symbol index is further determined based on whether a carrier is of a legacy type or a new type.

8. The method of claim 6, wherein a value of the starting symbol index is further determined based on a subframe index.

9. The method of claim 6, wherein the starting symbol index for ePDCCH is different from a starting symbol index for the ePCFICH.

10. The method of claim 6, further comprising determining a number of ePDCCH resource sets.

11. The method of claim 6, further comprising determining a size of at least one ePDCCH resource set.

12. The method of claim 6, further comprising determining a location of at least one ePDCCH resource.

13. An apparatus for wireless communication at a user equipment (UE), comprising:
  means for receiving, at the UE, a message via an enhanced physical control format indicator channel (ePCFICH) indicating resources for an enhanced physical downlink control channel (ePDCCH),
  the message comprising at least one ePCFICH value indicating resources reserved for a localized ePDCCH and resources reserved for a distributed ePDCCH;
  means for splitting, at the UE, a search space between the localized ePDCCH and distributed ePDCCH based on the at least one ePCFICH value; and
  means for processing, at the UE, the ePDCCH using the message.

14. The apparatus of claim 13, further comprising:
  means for receiving at least one physical control format indicator channel (PCFICH) value; and
  means for splitting a search space between a physical downlink control channel (PDCCH) and the ePDCCH based on the at least one PCFICH value and the at least one ePCFICH value.

15. The apparatus of claim 13, wherein the ePCFICH is based on a function of at least a physical cell identifier (PCI) or a virtual cell identifier, wherein the virtual cell identifier is not based on the PCI.

16. The apparatus of claim 13, further comprising:
  means for processing an enhanced physical downlink control channel (ePDCCH) using a default set of resources when an enhanced physical control format indicator channel (ePCFICH) is not detected.

17. The apparatus of claim 16, wherein the default set of resources correspond to a set of resources specified for a common search space for ePDCCH.

18. The apparatus of claim 13, further comprising:
  means for determining, at the UE, either a starting symbol index for the ePDCCH or one or more ePDCCH resource sets based at least on the received at least one ePCFICH value; and
  means for determining, at the UE, whether an ePDCCH transmission mode for at least one ePDCCH resource set comprises a localized ePDCCH transmission mode or a distributed ePDCCH transmission mode.

19. The apparatus of claim 18, wherein a value of the starting symbol index is further determined based on whether a carrier is of a legacy type or a new type.

20. The apparatus of claim 18, wherein a value of the starting symbol index is further determined based on a subframe index.

21. The apparatus of claim 18, wherein the starting symbol index for ePDCCH is different from a starting symbol index for the ePCFICH.

22. The apparatus of claim 18, further comprising means for determining a number of ePDCCH resource sets.

23. The apparatus of claim 18, further comprising means for determining a size of at least one ePDCCH resource set.

24. The apparatus of claim 18, further comprising means for determining a location of at least one ePDCCH resource.

25. An apparatus for wireless communication at a user equipment (UE), comprising:
  a processing system configured to:
  receive, at the UE, a message via an enhanced physical control format indicator channel (ePCFICH) indicating resources for an enhanced physical downlink control channel (ePDCCH),
  the message comprising at least one ePCFICH value indicating resources reserved for a localized ePDCCH and resources reserved for a distributed ePDCCH;
  split, at the UE, a search space between the localized ePDCCH and distributed ePDCCH based on the at least one ePCFICH value; and
  process, at the UE, the ePDCCH using the message.

26. The apparatus of claim 25, wherein the processing system is further configured to:
  receive at least one physical control format indicator channel (PCFICH) value; and
  split a search space between a physical downlink control channel (PDCCH) and the ePDCCH based on the at least one PCFICH value and the at least one ePCFICH value.

27. The apparatus of claim 25, wherein the ePCFICH is based on a function of at least a physical cell identifier (PCI) or a virtual cell identifier, wherein the virtual cell identifier is not based on the PCI.

28. The apparatus of claim 25, wherein the processing system is further configured to:
  process an enhanced physical downlink control channel (ePDCCH) using a default set of resources when an enhanced physical control format indicator channel (ePCFICH) is not detected.

29. The apparatus of claim 28, wherein the default set of resources correspond to a set of resources specified for a common search space for ePDCCH.

30. The apparatus of claim 25, wherein the processing system is further configured to:
  determine, at the UE, either a starting symbol index for the ePDCCH or one or more ePDCCH resource sets based at least on the received at least one ePCFICH value; and
  determine, at the UE, whether an ePDCCH transmission mode for at least one ePDCCH resource set comprises a localized ePDCCH transmission mode or a distributed ePDCCH transmission mode.

31. The apparatus of claim 30, wherein a value of the starting symbol index is further determined based on whether a carrier is of a legacy type or a new type.

32. The apparatus of claim 30, wherein a value of the starting symbol index is further determined based on a subframe index.

33. The apparatus of claim 30, wherein the starting symbol index for ePDCCH is different from a starting symbol index for the ePCFICH.

34. The apparatus of claim 30, the processing system further configured to determine a number of ePDCCH resource sets.

35. The apparatus of claim 30, the processing system further configured to determine a size of at least one ePDCCH resource set.

36. The apparatus of claim 30, the processing system further configured to determine a location of at least one ePDCCH resource.

37. A non-transitory computer-readable medium storing computer executable code for wireless communication at a user equipment (UE), comprising code for:
   receiving, at the UE, a message via an enhanced physical control format indicator channel (ePCFICH) indicating resources for an enhanced physical downlink control channel (ePDCCH),
   the message comprising at least one ePCFICH value indicating resources reserved for a localized ePDCCH and resources reserved for a distributed ePDCCH;
   splitting, at the UE, a search space between the localized ePDCCH and distributed ePDCCH based on the at least one ePCFICH value; and
   processing, at the UE, the ePDCCH using the message.

38. The non-transitory computer-readable medium of claim 37, wherein the ePCFICH is based on a function of at least a physical cell identifier (PCI) or a virtual cell identifier, wherein the virtual cell identifier is not based on the PCI.

39. The computer-readable medium of claim 37, further comprising code for:
   processing an enhanced physical downlink control channel (ePDCCH) using a default set of resources when an enhanced physical control format indicator channel (ePCFICH) is not detected.

40. The non-transitory computer-readable medium of claim 37, further comprising code for:
   determining, at the UE, either a starting symbol index for the or one or more ePDCCH resource sets based at least on the received at least one ePCFICH value; and
   determining, at the UE, whether an ePDCCH transmission mode for at least one ePDCCH resource set comprises a localized ePDCCH transmission mode or a distributed ePDCCH transmission mode.

41. The method of claim 1, wherein the at least one ePCFICH value comprises a first bit that indicates the resources for the localized ePDCCH and a second bit that indicates the resources for the distributed ePDCCH.

* * * * *